(12) United States Patent
Brewer et al.

(10) Patent No.: US 6,459,510 B1
(45) Date of Patent: Oct. 1, 2002

(54) DIGITAL DOCUMENT SCANNER WITH A DOCUMENT SUPPORT ASSEMBLY

(75) Inventors: Charles Raymond Brewer, Farmington; Henry Thomas Kremers, Fairport, both of NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/330,554

(22) Filed: Jun. 11, 1999

(51) Int. Cl.[7] .................................................. H04N 1/04
(52) U.S. Cl. ........................................ 358/497; 358/474
(58) Field of Search .................................. 358/400, 401, 358/471, 474, 475, 494, 497, 496, 498, 296; 399/362, 379, 380; 250/208.1

(56) References Cited

U.S. PATENT DOCUMENTS

| | | | | |
|---|---|---|---|---|
| 3,825,338 A | * | 7/1974 | Kolibas | 355/25 |
| 4,143,960 A | * | 3/1979 | Tracy | 355/75 |
| 4,415,255 A | * | 11/1983 | Huber et al. | 355/75 |
| 5,012,275 A | | 4/1991 | Bock | 355/25 |
| 5,053,819 A | * | 10/1991 | Malyon et al. | 355/75 |
| 5,072,252 A | | 12/1991 | Howseman, Jr. | 355/1 |
| 5,359,207 A | | 10/1994 | Turner | 257/81 |
| 5,475,505 A | | 12/1995 | Minasian et al. | 358/474 |
| 5,526,098 A | * | 6/1996 | Peck et al. | 355/75 |
| 5,619,302 A | | 4/1997 | Wu | 355/25 |
| 5,636,006 A | | 6/1997 | Wu | 355/75 |
| 5,712,718 A | * | 1/1998 | Chen | 359/201 |
| 5,847,846 A | | 12/1998 | Wu et al. | 358/475 |
| 6,195,152 B1 | * | 2/2001 | Hyman | 355/25 |

FOREIGN PATENT DOCUMENTS

| | | |
|---|---|---|
| EP | 371 765 A2 | 6/1990 |
| EP | 533 109 A2 | 3/1993 |
| GB | 2 220 759 A | 1/1990 |

* cited by examiner

Primary Examiner—Cheukfan Lee
(74) Attorney, Agent, or Firm—Oliff & Berridge, PLC; Eugene Palazzo

(57) ABSTRACT

A digital input scanner suitable for copying bound documents. The scanner comprises a scanner base portion, and a bound document support assembly attached to a top of the scanner base portion. The support assembly includes a generally horizontal top platen support surface and a plurality of exterior side surfaces. A digital scanning assembly is supported within at least a portion of the scanner base portion for acquiring an image of a portion of the bound document, and for generating an output digital signal representative of the acquired document face. The scanner components are arranged such that one of the exterior side surfaces of the support assembly has a canted surface, and the canted side surface and the top platen support surface form an oblique angle therebetween. The side surface and top surface are positioned to support opposing faces of the bound document during use.

19 Claims, 4 Drawing Sheets

DIGITAL DOCUMENT SCANNER WITH A DOCUMENT SUPPORT ASSEMBLY

BACKGROUND OF THE INVENTION

The present invention relates to an image reproducing systems and apparatus, and more particularly relates to a digital document scanner or digital copier system that employs a support assembly for supporting a document in a selected scanning position.

Presently, it is desirable as an adjunct to electronic document production to acquire image information directly from printed original documents. Typically, image information is acquired by placing a document, such as a bound document, directly on a flat platen surface of a scanner or copier. A conventional input scanner suitable for acquiring such an image are flat bed type scanners, which are well known and well characterized in the art. A typical problem associated with acquiring images of text contained in the bound document is the potential damage incurred by the spine of the bound document when opened and opposing faces of the bound document are placed on the platen surface of the flat-bed scanner. This problem is particularly acute when copies are made of text in rare or historically important books.

In order to address this problem, prior art raster-type input scanners, as provided in U.S. Pat. Nos. 5,636,006, 5,619,302 and 5,012,275, employ a pyramidal shaped platen surface for laying the book over the sides of the platen to acquire an image of one or more faces of the bound document without unduly stressing the document spine. A problem with such arrangements is that it requires elaborate optical assemblies for acquiring the image data directly from the bound document. Other conventional raster-type scanners and copiers employ a book edge formed along an edge of the platen surface in order to reduce stress on the spine. Generally this type of housing arrangement provides a platen supported horizontally relative to a general document support surface attached to a side of the housing, with the platen edge meeting an upper edge of the support surface in order to allow the bound document to be draped over the side of the machine. This housing arrangement supports the facing pages of the bound document in positions intended to reduce the stress on the spine. However, scanners of this type also employ complex optical arrangements in order to adequately capture an image information from the document.

A common overall problem with the image input or reproducing devices described above is that they do not provide for significant flexibility in handling and manipulating image data acquired directly from the original bound document. Hence, this necessitates handling the rare book multiple times, which can further increase the risk of damage to the bound document.

Another drawback of the prior-art image reproducing devices is that do not allow for manipulation of the acquired image data, for subsequent use in formats different than the originally available image.

Hence, there still exists a need in the art for improved image acquisition devices that can acquire image data from bound documents without damaging the document spine, while concomitantly capturing the image data in a format that allows for easier downstream data processing and manipulation. In particular, an image acquisition arrangement that provides for easier document handling and image data manipulation would represent a major improvement in the art.

The invention will next be described in connection with certain preferred embodiments. However, it should be clear that various changes and modifications can be made by those skilled in the art without departing from the spirit and scope of the invention.

SUMMARY OF THE INVENTION

The present invention provides for a digital input scanner suitable for copying bound documents. The scanner comprises a scanner base portion, and a bound document support assembly attached to a top of the scanner base portion. The support assembly includes a generally horizontal top platen support surface and a plurality of exterior side surfaces. A digital scanning assembly is supported within at least a portion of the scanner base portion for acquiring an image of a portion of the bound document, and for generating an output digital signal representative of the acquired document face. The scanner components are arranged such that one of the exterior side surfaces of the support assembly has a canted surface, and the canted side surface and the top platen support surface form an oblique angle therebetween. According to one aspect, these surfaces are positioned such that the top platen support surface and the canted side surface support opposing faces of the bound document during use.

According to another aspect, the canted side surface of the digital scanner includes a first canted top surface that forms a common edge with the top platen surface, and a second canted surface that extends outwardly and away from the first canted surface. In this arrangement, the first canted surface is transverse to the second canted surface. The oblique angle formed by the surfaces is between about 90 degrees and about 155 degrees, and is preferably about 148 degrees.

According to still another aspect, the digital scanner includes a rigid support element attached to the second canted surface for further supporting one of the faces of the bound document during use.

According to yet another aspect, the scanner support assembly when attached to the top of the scanner base portion is configured as an upper extension of the scanner base, such that it extends completely upwardly from the scanner base portion in order to facilitate support of the bound document during use. Hence, in this configuration, the support assembly is not simply a clip-on side piece, but rather forms an integral extension of an upper portion of the scanner base.

The present invention also provides for a digital input scanner suitable for copying bound documents, comprising a scanner housing having a generally horizontal top platen support surface for supporting a platen, and a plurality of exterior side surfaces, and a digital scanning assembly mounted within the housing. The digital scanning assembly includes a light source for illuminating an underside of the top platen surface, a plurality of photosensitive elements positioned to receive light reflected from the underside of the platen surface and for generating electrical output signals, and a digital converter for converting the electrical output signals into digital output signals representative of the acquired image. According to one aspect, one of the scanner side surfaces has a canted surface that abuts the top platen surface along a top edge. The side surface and the top platen support surface are positioned relative to each other to form an oblique angle therebetween. The top platen support surface and the canted side surface support at least a portion of opposing faces of the bound document during use. The scanner side surface comprises a first canted top surface that forms a common edge with the top platen support surface, and a second canted surface that extends outwardly and away from the first canted surface. The first canted surface is preferably transverse to the second canted surface.

According to another aspect, the digital scanner includes a rigid support element that is attached to the second canted surface for further supporting one face of the bound document during use.

According to still another aspect, the digital scanner includes an output digital communication pathway coupled to the digital scanning assembly for transferring the digital signals to a remote processing device.

The present invention further contemplates a digital scanning system suitable for copying bound documents, comprising a digital scanner or scanning stage having a base portion, a bound document support assembly attached to a top of the scanner base portion, and a digital scanning assembly supported within the base portion for acquiring an image of the bound document and for generating an output digital signal representative of the document. One of the side surfaces of the support assembly has a canted surface that forms an oblique angle relative to the top surface. The system also includes a printer module disposed in communication with the digital scanner for receiving the digital output signals.

According to one aspect, the printer module receives the digital output signals from the digital scanner, and has a data manipulation or control stage for copying a portion of a face of the bound document, manipulating the image according to user input instructions, storing the image in a suitable memory module, and transferring multiple copies of the image onto a single substrate.

According to another aspect, one of the scanner side surfaces includes a first canted surface that forms a common edge with the top platen support surface, and a second canted surface that extends outwardly and away from the first canted surface, such that the first canted surface is transverse to the second canted surface.

Other general and more specific objects of the invention will in part be obvious and will in part be evident from the drawings and description which follow.

BRIEF DESCRIPTION OF THE DRAWINGS

The foregoing and other objects, features and advantages of the invention will be apparent from the following description and apparent from the accompanying drawings, in which like reference characters refer to the same parts throughout the different views. The drawings illustrate principles of the invention and, although not to scale, show relative dimensions.

DESCRIPTION OF ILLUSTRATED EMBODIMENTS

Figure 1:
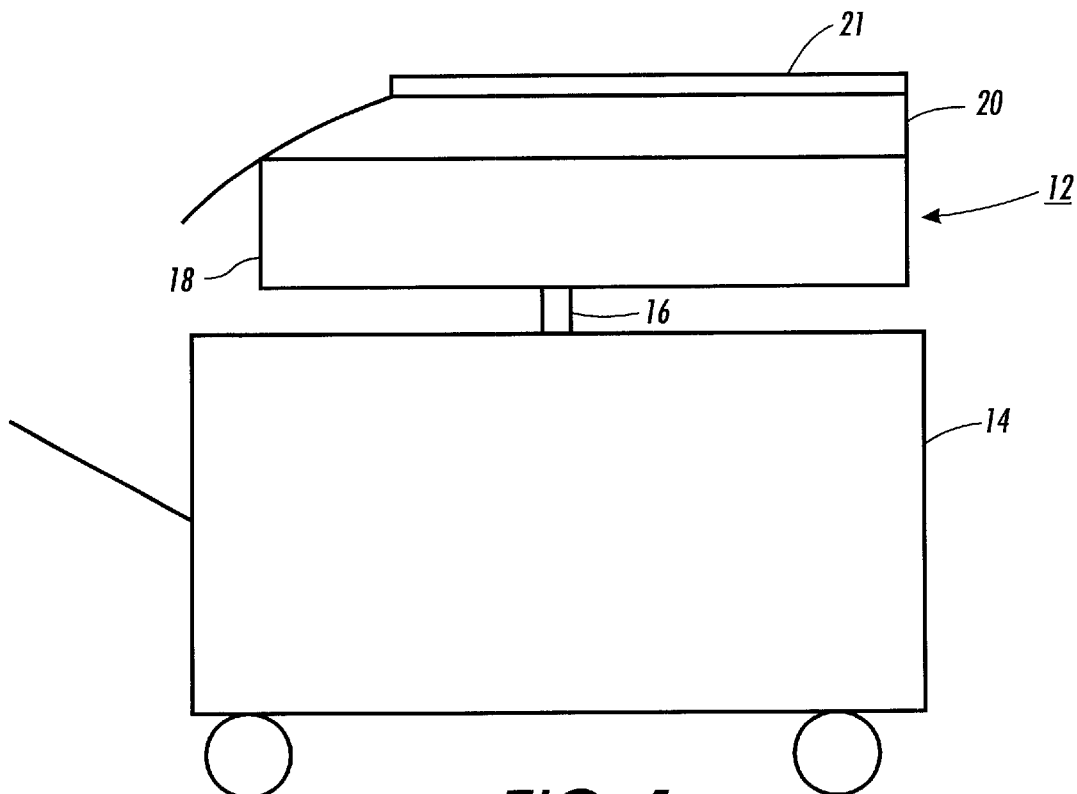
FIG. 1 is a perspective view of a digital document image acquisition system in accordance with the teachings of the present invention.

FIG. 1 is a schematic view of a digital document image acquisition system 10 in accordance with the teachings of the present invention. The illustrated system 10 employs, according to one embodiment, a digital scanner or scanning stage 12 and a printing module 14. The illustrated digital scanner 12 is operatively coupled to the printer module 14 by a communication or data pathway 16, and can be, if desired, physically and mechanically mounted onto or adjacent to the printer module 14. Although illustrated as a separate digital scanner 12 and printer module 14, those of ordinary skill will readily recognize that the input digital scanner and the printer module of the system 10 can be incorporated into a single integrated digital copier/printer unit, or can comprise separate, discrete components. The components, if separate, can be physically remote from one another, and can be disposed in communication with one another according to known techniques, such as through a suitable network connection.

The illustrated digital image acquisition system 10 is configured for acquiring an image of a document, such as a bound document, generating a set of digital output image data, and transferring this digital image data across the communication pathway 16 to the printer module 14. The illustrated printer module 14 preferably reproduces the image of the bound document on a selected medium or substrate, such as paper, in accordance with known techniques. The generation of the digital image data or information, and the subsequent transfer of this data to the printer module, allows the printer module to edit, manipulate, process, store and reproduce the image in multiple, different styles and formats. Hence, a selected user can acquire a single image of the bound document with the scanner 12, generate an associated digital image data representative of an image of the bound document, and then transfer this digital image data to the printer module 14 for subsequent processing.

As used herein, the term "document" refers to an image-bearing original from which copying is desired. Documents may comprise image-supporting substrates, such as cut sheets of paper, transparencies, or other individual pieces of particularly resilient material, unburst computer forms forming a continuous length of material, or any image-bearing substrate from which copying is desired. The present invention is particularly adapted for copying "bound documents" or books, which include a plurality of bound sheets disposed in a logical sequence. When opened, bound documents have a pair of faces or facing pages, both of which may have images thereon. The term "spine" or binding is intended to refer to the arrangement by which the sheets forming the bound document are held together. Moreover, the term "image" as used herein refers to the visible information or indicia located on the document or bound document, for which scanning or printing is desired, and which will be in some manner copied to another substrate or stored in an electronic storage medium. The illustrated digital scanner 12 scans an image of the document or bound document in accordance with known techniques. Thus, the term "scanning" can refer to the relative movement of the photosensitive sensors with respect to documents for the purpose of acquiring an electronic representative of the image, or alternatively can refer to the illumination of a page or facing page of the document or bound document with a light source, and to the subsequent capture of the reflected light of by an array of photosensitive elements. The term "printing module" is intended to include any conventional printing or copying device that is capable of receiving input image information, and transferring this information onto a suitable substrate. The printing module can be a separate discrete component, or can be part of a larger integrated product or system, such as a copier or printer, and is preferably a digital copier or printer.

Although not illustrated in the appended drawings, a user interface can be provided for allowing a user of the digital image acquisition system 10 to control the image capture and copying/printing functions of the system, while concomitantly allowing the user to reproduce the image on a suitable substrate in a particular manner or format. These particular functions are discussed further below.

Figure 2:
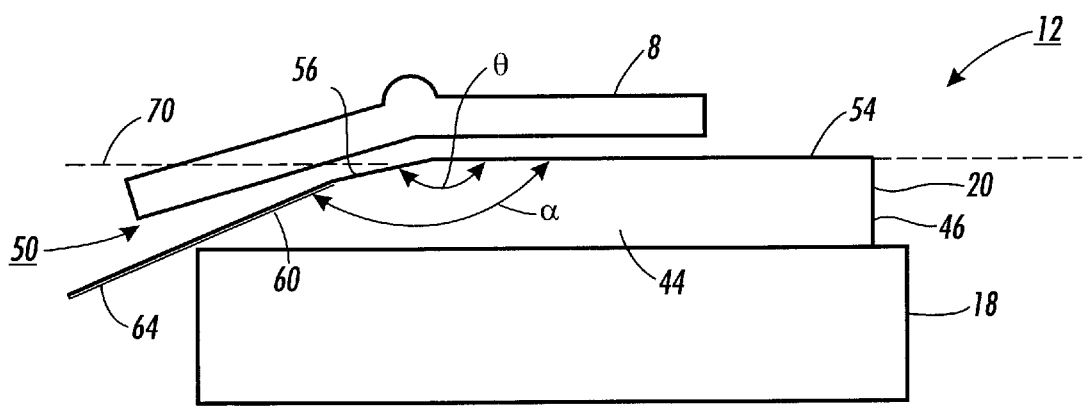
FIG. 2 is a side perspective view of a digital scanner component of the system of FIG. 1 illustrating the bound document support edge of the scanner support assembly.

FIG. 2 is a general schematic diagram of the digital scanner component or stage of the illustrated system 10. The digital scanner can be any conventional digital scanner, or digital scanning portion of a printing/copying system, modified in accordance with the teachings of the present invention. Those of ordinary skill will readily recognize that digital scanners are well known and well characterized in the art. Thus, as used herein, the term "scanner" is intended to include a device for capturing or acquiring an image of an object, such as a bound document, and for generating appropriate output image data. The scanner can be a stand alone discrete scanner or can encompass the scanning or scanner input arrangement of a single integrated image unit, such as a copier or printer. According to a preferred practice the scanner is a digital scanner, which is either a separate scanner or a digital image acquisition component of a printing/copying system.

The illustrated scanner 12 includes a scanner base portion 18 and a support assembly 20 that is mounted or attached to a top portion of the scanner base portion 18. The support assembly 20 is preferably configured with a series of canted sides or surfaces to accommodate and provide for the scanning of one or more facing pages of a book B. The digital scanner 12 shown in FIG. 2 is intended to be a general schematic illustrative embodiment of a conventional digital scanner, with selected unimportant features omitted for simplicity.

Figure 3:
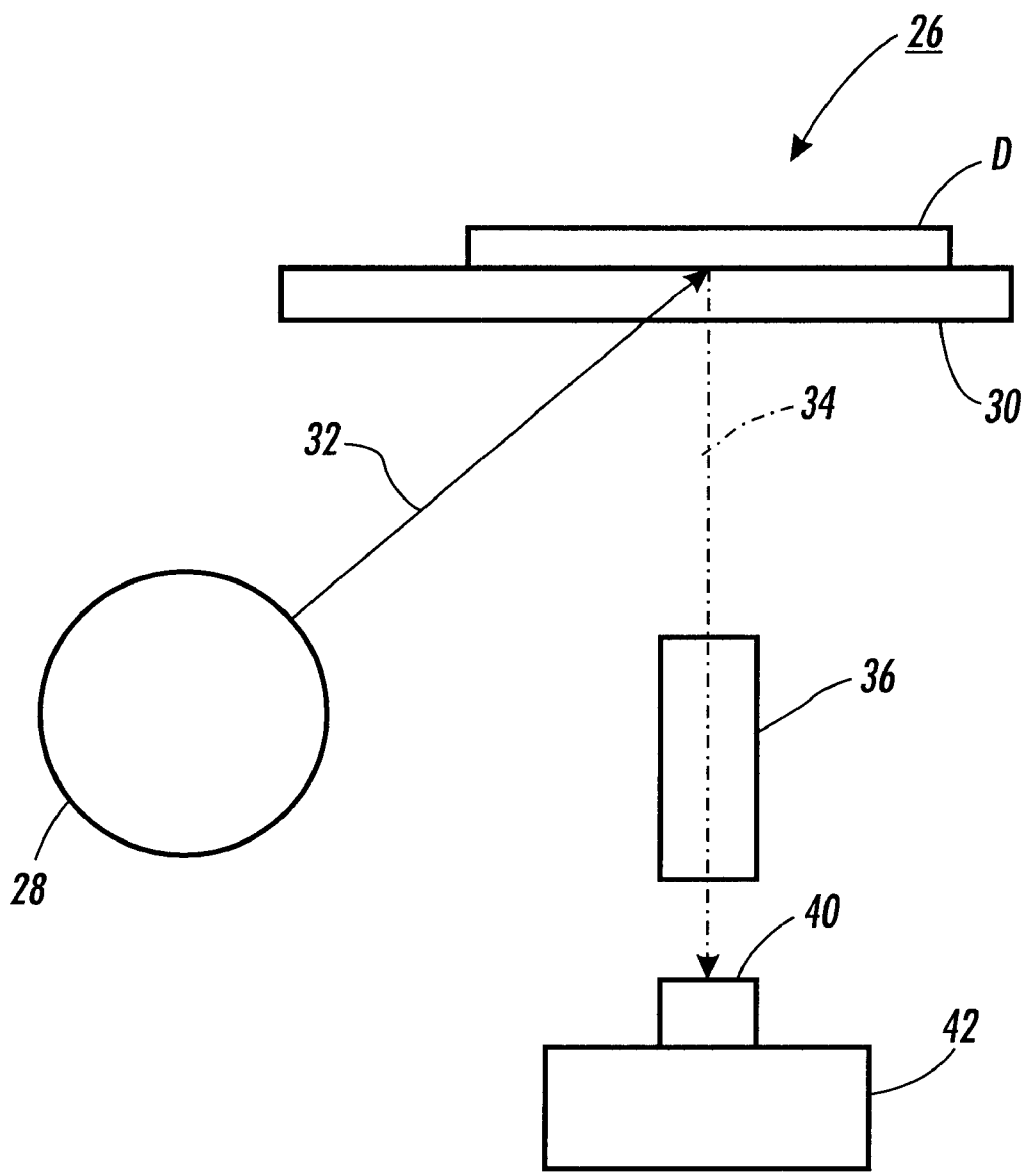
FIG. 3 is a schematic representation of selected components of the digital scanning assembly housed in a base portion of the digital scanner component of the system of FIG. 1.

With reference to FIGS. 2 and 3, the digital document scanner 12 employs a digital scanning assembly 26 that is preferably mounted on the scanner base portion 18, but is also optically and/or physically coupled to the support assembly 20. The digital scanning assembly 26 includes a radiation source, such as the light source 28, that is positioned to illuminate a document or a bound document D, such as the book B of FIG. 2, having an original image to be scanned on a face of the document D. The document face preferably contacts a glass platen 30 that mounts on a top surface of the support assembly 20, as described in greater detail below. The illustrated digital scanner can include the glass platen 30 upon which the document rests if the digital scanning system is a platen digital scanning system. However, those of ordinary skill will readily recognize that if the digital document scanner is a constant velocity transport assembly (CVT), the digital document scanner need not necessarily include a glass platen. The illustrated light source 28 generates light 32 that passes through the glass platen 30 and impinges upon a face of the document D. The light 34 reflected from the document face is collected by an optical lens system 36 and is directed onto a photoelectric assembly or system 40. The photoelectric system 40 converts the light to either electrical charges or electrical signals by use of a CCD sensor or a full width CCD array. In this manner, the light reflected 34 from the document D is converted into electronic signals forming image data which electronically represents the original image on the document D. The electrical signals are passed to a digital converter 42, which converts the electrical signals into digital output signals representative of the image scanned by the digital scanner 12. Those of ordinary skill will readily recognize that the photoelectric array 40 and the digital converter 42 can be separate discrete components, or can form part of a single integrated electronic assembly.

It is common practice to provide a transport assembly (not shown) within the scanner 12 to move the photoelectric system in a scanning direction. Those of ordinary skill will readily recognize and understand the cooperation between conventional scanner components and assemblies necessary to acquire or scan an image of the document D. The components of a conventional digital scanner not directly related to the present invention are omitted herein for purposes of clarity and simplicity.

Figure 4:
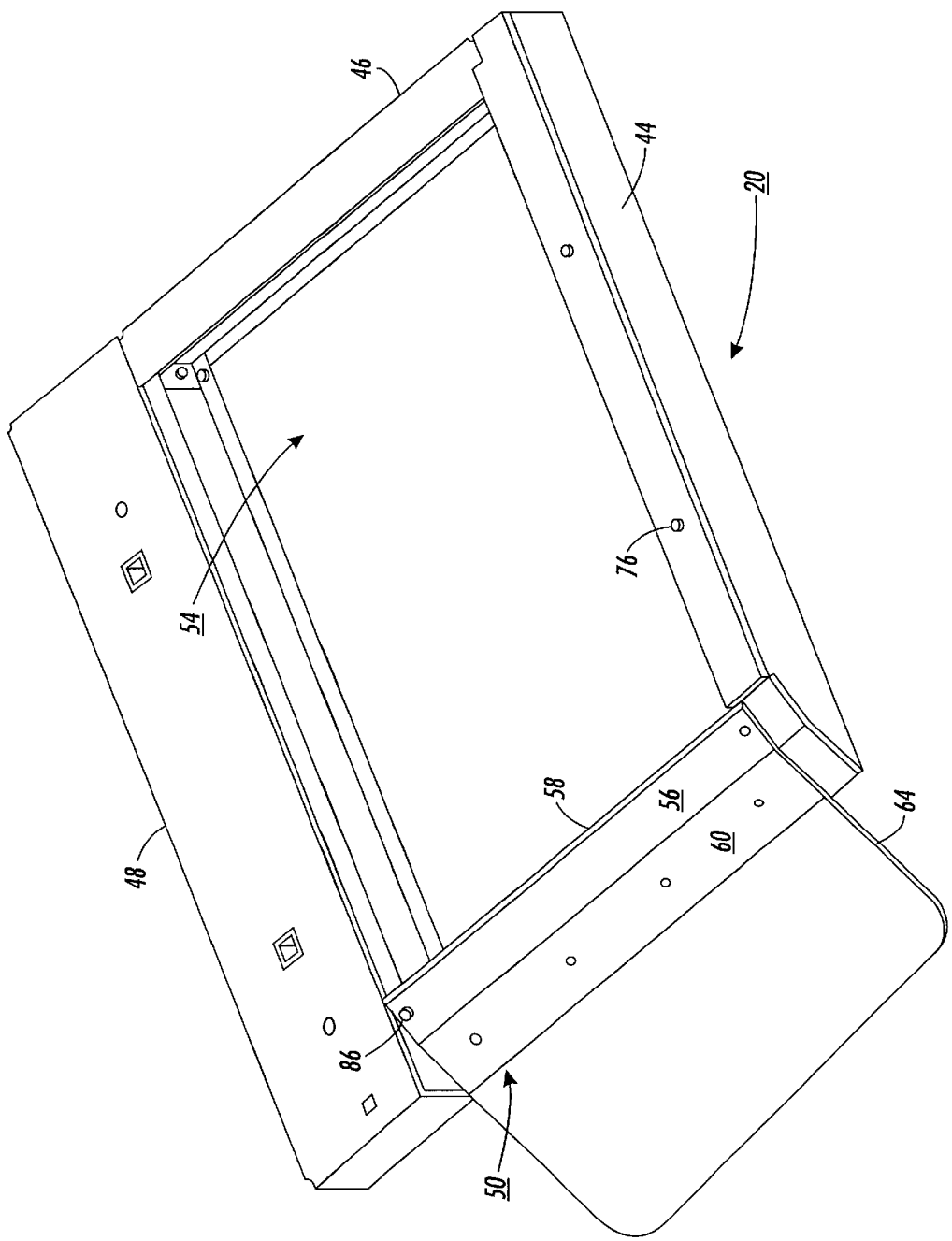
FIG. 4 is a perspective view of the support assembly of the digital scanner component of the system of FIG. 1.
Figure 5:
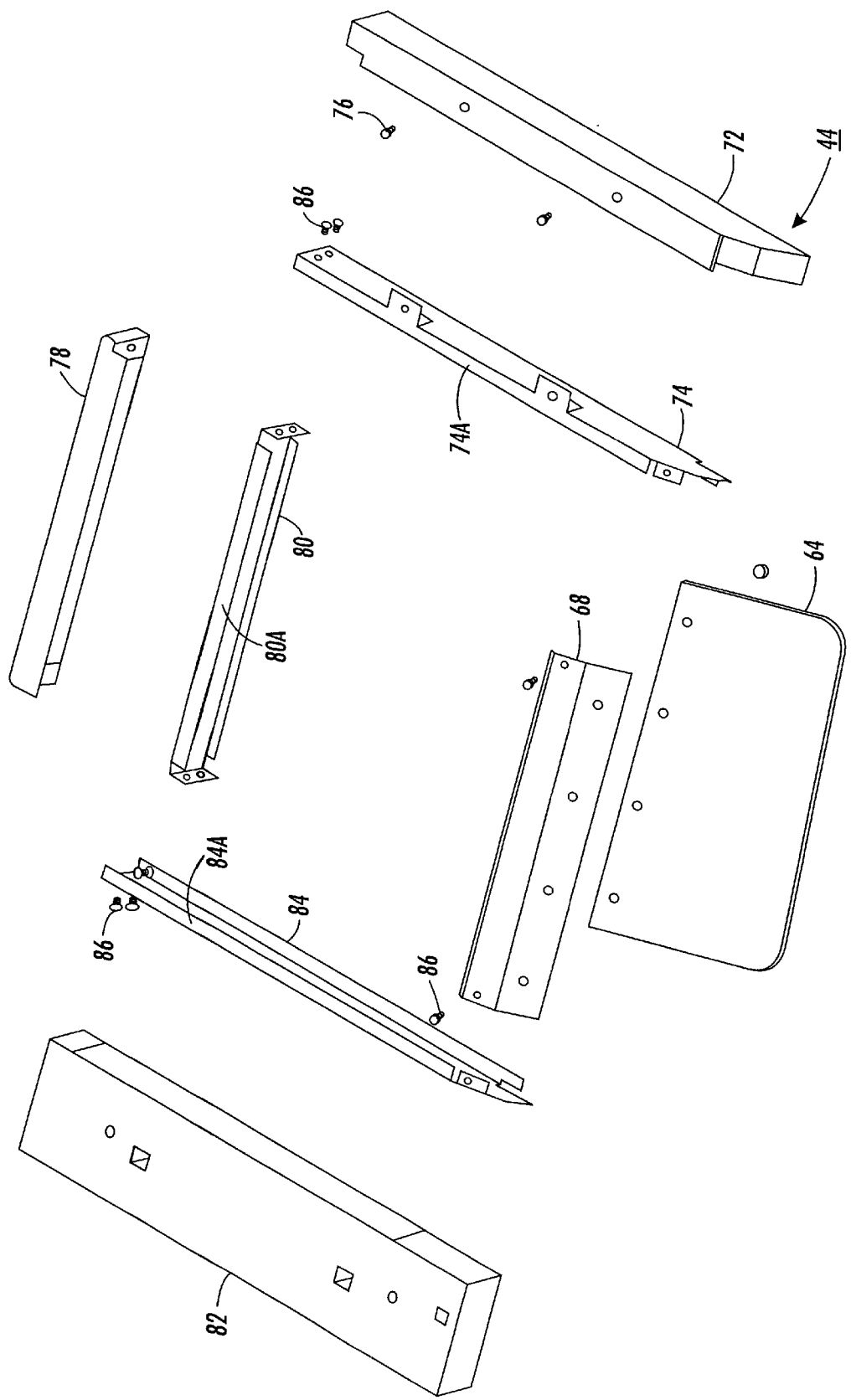
FIG. 5 is an exploded perspective view of the support assembly of FIG. 4.

With reference to FIGS. 2, 4 and 5, the illustrated digital scanner 12 employs a support assembly 20 that mounts or attaches to the scanner base 18. According to a preferred practice, the support assembly 20 mounts only to a top portion of the scanner base 18, as illustrated in FIG. 2, thus forming an integral extension of the scanner base. FIGS. 4 and 5 are perspective views of the support assembly 20 removed from the scanner base portion 18 in assembled and unassembled forms, respectively. When assembled, the support assembly 20 forms a plurality of exterior sides 44, 46, 48, and 50, and a top platen support surface 54 for mounting a glass platen, such as the platen 30, FIG. 3. The exterior side 50 of the support assembly 20 forms a book support surface along one side of the digital scanner 12. In particular, the illustrated side 50 includes a first side surface 56 that forms a common edge 58 with the top platen support surface 54. The illustrated common edge 58 forms a registration edge for placement of the bound document during use of the digital scanner 12. The first surface 56 of the side surface 50 is canted relative to the generally horizontal top platen surface 54, as illustrated in FIG. 2. The top platen surface 54 and the first canted surface 56 form an oblique angle θ that is between about 90 degrees and about 155 degrees, and is preferably about 148 degrees. This angle range is chosen in order to prevent, eliminate, reduce or minimize damage to the spine of the bound document during scanning. Further, the first and second surfaces 56 and 60 are transverse relative to each other.

The illustrated scanner side 50 further includes a second surface 60 that is canted relative to both the first surface 56 and the top support surface 54. The second canted surface 60 preferably extends downwardly, outwardly and away from the top surface 54 and the first surface 56 of the scanner side 50. The second surface 60 forms an oblique angle α between the second surface 60 of the scanner side 50 and the top support surface 54. The angle α is preferably in the range between about 142 degrees and about 146 degrees, and is most preferably disposed at an angle of about 144 degrees. Those of ordinary skill will readily recognize that although the illustrated side surface 50 includes a pair of surfaces 56 and 60, the side surface 50 can include any suitable number of surfaces, such as a single exterior surface or three or more surfaces. The appropriate number of surfaces of the side 50 can be easily determined by the ordinarily skilled artisan in light of the teachings herein when considering the size and dimensions of the scanner and the type of bound documents to be scanned.

With further reference to FIGS. 2, 4 and 5, a rigid support extension element 64 attaches to the scanner side 50 to provide a support extension or additional support surface for further supporting a portion of one face of the bound document B. The illustrated rigid support extension 64 can be coupled to the side 50, such as the front leading edge of the support, in any conventional manner. The illustrated support extension 64 can be disposed at any suitable angle relative to the axis 70, and preferably forms an angle the same or similar to the oblique angle α formed between the second surface 60 of the scanner side 50. Hence, according to a preferred practice, the support extension 64 and the side surface 60 are essentially co-planar. With particular reference to FIG. 5, the support assembly 20 is illustrated in an unassembled form. The support assembly 20 includes an external side casing 72 that is mounted to an inner support bracket 74 by the fasteners 76. The combined external casing element 72 and the support bracket 74 form an exterior side 44 of the support assembly 20, and hence of the scanner 12. Likewise, the external casing element 82 is attached to the inner bracket 84 by any appropriate means, such as by mechanical fasteners or by a snap-fit configuration. The external casing element 82 and support bracket 84 form the exterior side 48 of the support assembly 20. The illustrated casing element 78 attaches to the inner bracket 80, which is configured to be disposed between the inner brackets 74 and 84 when assembled. Appropriate fasteners 86 fixedly attach the inner bracket 80 to the brackets 74 and 84. The exterior casing element 78 and the inner bracket 80 form the side 46 of the support assembly 20.

The scanner side 50 of the support assembly 20 is formed by mounting the book support 68 onto the illustrated angled edges of the brackets 74 and 84 with appropriate fasteners, such as with the screw-type fasteners 86. Moreover, the unitary book support 68 can be disposed in a position such that its external surfaces are transverse to the top platen support surface 54. The illustrated inner brackets 74, 80, and 84 each include an upper support flange 74A, 80A, and 84A, respectively. The support flanges 74A, 80A, and 84A form a lip region adapted for supporting the glass platen 30. When assembled, as illustrated in FIG. 4, the support assembly 20 provides a scanner assembly that employs a document support assembly for supporting opposing faces of a bound document in a position that avoids, reduces or eliminates damage to the spine of the document.

The illustrated scanner 12, which includes the scanner base 18 and the support assembly 20, can be formed or sold as a single integrated unit, or the support assembly can be employed to retrofit an existing digital scanner. When retrofitting a conventional scanner, those of ordinary skill will recognize that the position of the optical assembly within the scanner housing may have to be changed in order to accommodate the increased focal length of the system created by the addition of the assembly.

The illustrated scanner 12, which includes the scanner base 18 and the support assembly 20, can be formed from a molded plastic collection of members, with associated mounting hardware, which is configured to support scanner hardware and associated electronics. The scanner 12 further includes a platen cover 21, FIG. 1, which is coupled to one end, such as the side 46, for holding documents in place and for providing a white or other appropriate background backing for scanning operations. Conveniently, the platen cover 21 may be connected to the scanner housing by articulating hinges (not shown) which allow it to be closed over books of some thickness, while concomitantly closing flat over single page documents.

In operation, one face of a bound document or book is supported on or in superposed relationship with the platen, which is supported by the top platen surface 54 of the support assembly 20. The scanning platen 30 is typically formed of transparent glass, which may have an anti-glare coating. A second or opposing face of the bound document is supported on the book support edge 68 of the support assembly 20. In particular, the other book face is supported by one or more of the surfaces 56 and 60 of the scanner side 50, as well as, if desired, by the rigid support extension element 64. Hence, the top platen surface 54, the scanner side 50, and the support extension element 64 form a bound document supporting arrangement in accordance with the teachings of the present invention for supporting multiple faces of a bound document during scanning. Those of ordinary skill will recognize that it is common practice to dispose the common edge 58 of the support assembly 68 as close as mechanically possible to the leading edge of the platen surface 54 in order to allow scanning as deep as possible into the binding area or spine of the bound document.

The base portion 18 preferably mounts the digital scanning assembly therein. Appropriate means are provided to support the scanning assembly within the base portion, as well as to move particular components of the assembly in a scanning direction. For example, in accordance with the operation and configuration of conventional digital scanners, appropriate mechanical and electronic assemblies can be provided for moving the photosensitive array and/or particular optical components in a scanning direction. A suitable user interface can be provided to allow a system operator to supply control signals to the system 10 in order to actuate the image acquisition process. In particular, once the face of the book placed on the platen 30, the digital scanning assembly is actuated to scan the exposed face of the document. The light reflected from the face is directed to the photoelectric system 40, which converts the optical information into electrical image data. This image data is then converted into appropriate digital output image signals by the digital converter 42. The illustrated digital output signals, which are representative of at least a portion of the image scanned by the digital scanner 12, are transferred by an appropriate communications cable, such as the communication pathway 16, to the printer module 14.

With reference to FIG. 1, the illustrated printer module 14 can perform any of the appropriate printing functions in accordance with traditional electrostatic and digital copiers. The digital output signals can be transferred to a raster-type output scanning module of the printer, which applies raster scanning lines onto a photoreceptive element, such as a belt type photoconductive element. This assembly forms a latent image on the photoconductive element. Conventional development assemblies can be employed to transfer the latent image onto a substrate.

In accordance with a preferred embodiment of the present invention, the digital output signals produced by the scanner 12 are transferred to a digital printer module, which employs an appropriate control facility to store and manipulate the digital image data. In particular, appropriate electronic assemblies, which would be obvious to the ordinary skilled artisan in accordance with the teachings of the present invention, can be employed to store the digital image data in a selected storage module, such as on RAM, ROM, or on a suitable disk. The printer module may also include facilities for digitally copying the image onto a substrate, or providing appropriate facilities for manipulating the image data prior to transfer to a substrate, such as automatically rotating the image, enlarging the image, placing multiple images on a single substrate, or customizing the image by editing, centering, deleting selected regions, such as edge portions, and spatially shifting the image prior to transfer to the substrate. Those of ordinary skill will recognize that the scanner and printer module of the present invention can be combined into a single digital copier/printer/facsimile system, examples of which include the integrated digital copiers sold under the trade designation Document Centre 220, 220ST, 230, and 230ST manufactured by Xerox Corporation, USA. Moreover, digital copiers or printer modules in general are well characterized in the art, and their functionalities and control and data manipulation facilities are described, for example, in U.S. Pat. Nos. 5,243,381, 5,081,595 and 5,452,068, all to the assignees hereof, and all of which are incorporated herein by reference.

A significant advantage of the present invention is that it provides for a digital image acquisition system, or input digital scanner that employs a book edge for scanning images from bound documents without damaging the spines thereof. Furthermore, the book support 68 is part of an overall document support assembly which is attached to a top portion of a scanner base portion in accordance with the teachings of the present invention. This entire assembly can be an add-on assembly for retrofitting existing digital scanners, without necessitating the purchase of new hardware components. Hence, the removable and replaceable aspect of the support assembly 20 provides for a simple and elegant solution to integrating a book support with an existing digital scanner or copier. The support assembly is particularly adapted for mounting to a top portion of a digital scanner, and preferably only to a top portion of the scanner, to accommodate proper scanning and subsequent manipulation of the digital image data.

Another significant advantage of the present invention is that the support assembly 20 of the digital scanner 12 provides for the ability to make multiple copies of the face of the bound document with a single scan. This can minimize handling of the bound document, which is particularly advantageous if the bound document is a rare book.

It will thus be seen that the invention efficiently attains the objects set forth above, among those made apparent from the preceding description. Since certain changes may be made in the above constructions without departing from the scope of the invention, it is intended that all matter contained in the above description or shown in the accompanying drawings be interpreted as illustrative and not in a limiting sense.

It is also to be understood that the following claims are to cover all generic and specific features of the invention described herein, and all statements of the scope of the invention which, as a matter of language, might be said to fall therebetween.

Having described the invention, what is claimed as new and desired to be secured by Letters Patent is:

1. A digital input scanner suitable for copying bound documents, comprising:
    a scanner base portion,
    a bound document support assembly attached to a top of said scanner base portion, said support assembly having a generally horizontal top platen surface for supporting a platen, and a plurality of exterior side surfaces, and
    a digital scanning assembly supported within said scanner base portion for acquiring an image of at least a portion of one face of the bound document and for generating an output digital signal representative of the portion of the document face,
    wherein a selected one of said exterior side surfaces of said support assembly is a first canted surface forming a first oblique angle between the top platen surface and the first canted surface, and a second canted surface extending outwardly from the first canted surface forms a second oblique angle between the second canted surface and the top platen surface, the first and second canted surfaces and the top platen surface support opposing faces of the bound document during use.

2. The digital scanner of claim 1, wherein the first canted surface forms a common edge with the top platen surface, and the first canted surface is transverse to the second canted surface.

3. The digital scanner of claim 2, further comprising a rigid support element attached to said second canted surface for further supporting a portion of one of the faces of the bound document during use.

4. The digital scanner of claim 1, wherein the first oblique angle is between about 90 degrees and about 155 degrees.

5. The digital scanner of claim 1, wherein the second oblique angle is about 148 degrees.

6. The digital scanner of claim 1, wherein said support assembly when attached to said top of said scanner base portion is configured as an upper extension of the scanner base such that it extends completely upwardly from said scanner base portion in order to facilitate support of the bound document during use.

7. The digital scanner of claim 1, wherein said plurality of photosensitive elements comprise a charge-coupled-device (CCD) array.

8. The digital scanner of claim 1, further comprising an output digital communication pathway coupled to said digital scanning assembly for transferring said digital signals to a remote processing device.

9. A digital input scanner suitable for copying bound documents, comprising:
    a scanner housing having a generally horizontal top platen surface for supporting a platen, and a plurality of exterior side surfaces, and
    a digital scanning assembly mounted within said housing, said digital scanning assembly including
    a light source for illuminating an underside of the top platen surface,
    a plurality of photosensitive elements positioned to receive light reflected from the underside of the platen surface, said photosensitive elements generating an electrical output signal representative of an image of at least a portion of the bound document, and
    a digital converter for converting the electrical output signals into digital output signals,
    wherein a selected one of said side surfaces of said scanner housing is a first canted surface that abuts the top platen surface along an edge, the first canted surface and the top platen surface forming a first oblique angle therebetween, such that the top platen surface and the first canted surface support at least a portion of opposing faces of the bound document during use, and a second canted surface extending outwardly from the first canted surface such that the second canted surface forms a second oblique angle between the second canted surface and the top platen surface.

10. The digital scanner of claim 9, wherein the first canted surface forms a common edge with the top platen surface, and the first canted surface is transverse to the second canted surface.

11. The digital scanner of claim 10, further comprising a rigid support element attached to said second canted surface for further supporting a portion of one of the faces of the bound document during use.

12. A digital scanner of claim 9, wherein the first oblique angle is between about 90 degree and about 155 degrees.

13. A digital scanning system suitable for copying a bound document, comprising:

a digital s canning portion having:
  a base portion,
  a bound document support assembly attached to a top of said scanner base portion, said support assembly having a generally horizontal top platen surface for supporting a platen , and a plurality of exterior side surfaces, and
  a digital scanning assembly supported within said base portion for acquiring an image of at least a portion of one face of the bound document and for generating an output digital signal representative of the portion of the document face,
  wherein a selected one of said side surfaces of said support assembly is a first canted surface, the first canted surface and the top platen surface forming a first oblique angle therebetween such that the top platen surface and the first canted surface support opposing faces of the bound document during use, and a second canted surface that extends outwardly from the first canted surface and forms a second oblique angle relative to the top platen surface; and
  a printer module in communication with said digital scanning portion to receive said digital output signal.

14. The digital scanning system of claim 13, further comprising an output digital communication pathway for coupling said output digital signals of said digital scanning portion to said printer module.

15. The digital scanning system of claim 13, wherein said printer module comprises
  means for receiving the digital output signals from said digital scanning portion, and
  at least one of means for copying in human readable form on a medium the digital signals representative of a portion of the face of the bound document, means for manipulating the image, means for storing the image, and means for transferring multiple copies of the image onto a single medium.

16. The digital scanning system of claim 13, wherein the first canted surface forms a common edge with the top platen surface, and the first canted surface is transverse to said second canted surface.

17. The scanning system of claim 16, further comprising a rigid support element attached to said second canted surface for further supporting a portion one of the faces of the bound document during use.

18. The scanning system of claim 16, wherein the first oblique angle is between about 90 degrees and about 155 degrees.

19. The scanning system of claim 16, wherein said printer module comprises means for manipulating image data associated with said digital signals.

* * * * *